July 7, 1942.  G. S. BINCKLEY  2,288,882
DIFFERENTIAL PRESSURE RELIEF VALVE
Filed Dec. 8, 1939   2 Sheets-Sheet 1
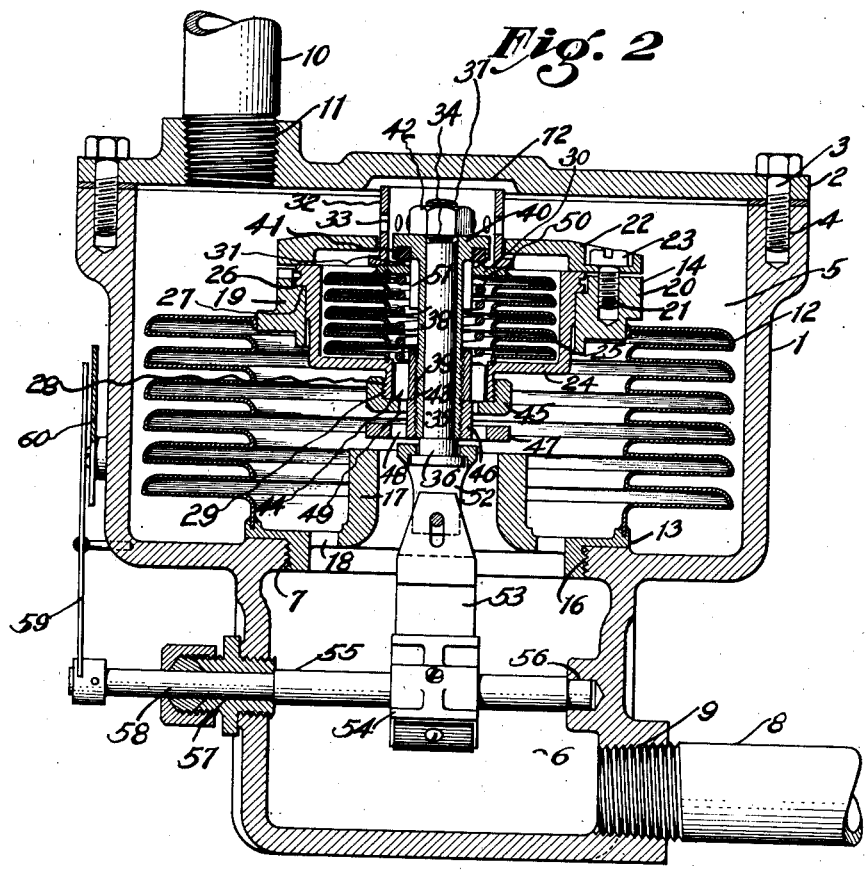
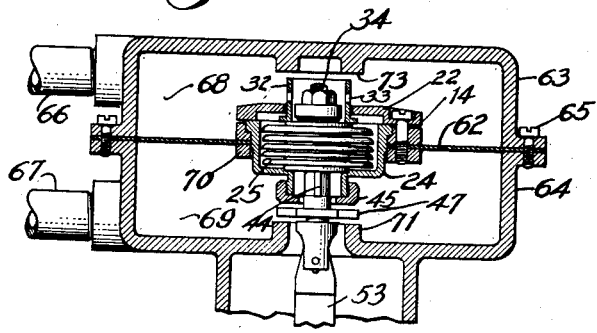
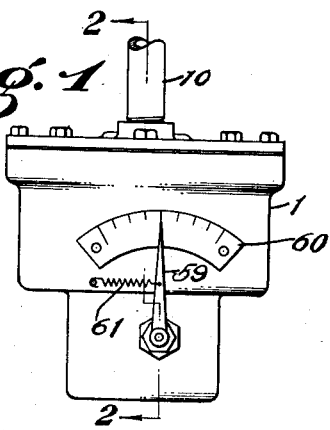
INVENTOR,
George S. Binckley;
BY Calvin Brown
ATTORNEY July 7, 1942.  G. S. BINCKLEY  2,288,882
DIFFERENTIAL PRESSURE RELIEF VALVE
Filed Dec. 8, 1939  2 Sheets-Sheet 2
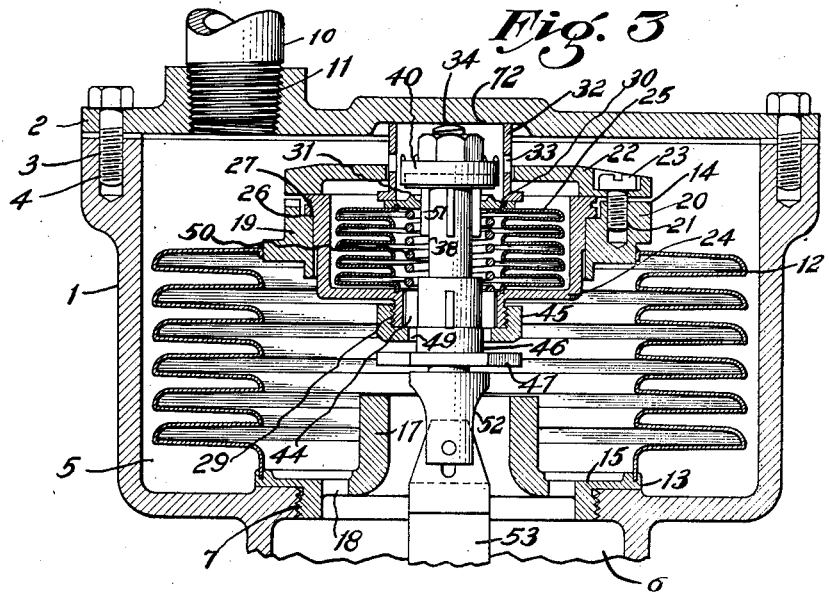
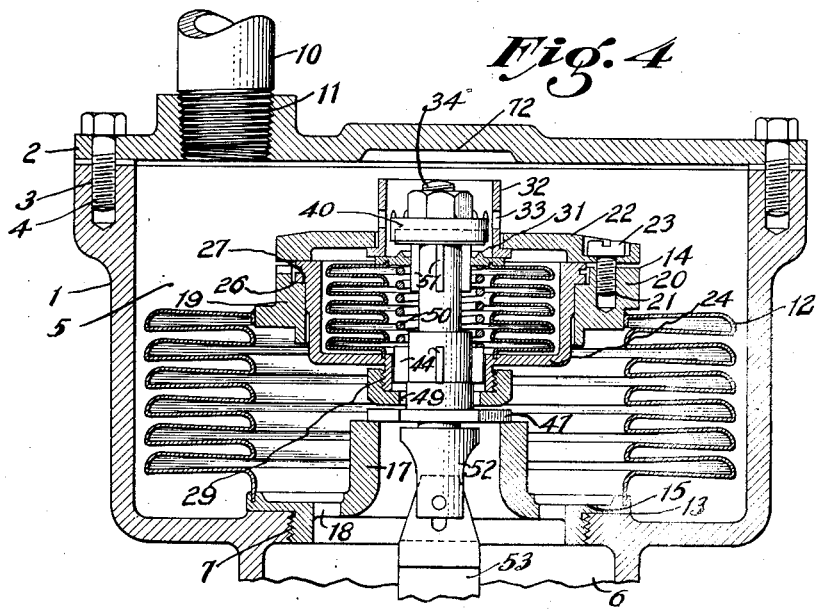
INVENTOR,
George S. Binckley;
BY
Calvin Brown
ATTORNEY Patented July 7, 1942

2,288,882

UNITED STATES PATENT OFFICE 2,288,882

DIFFERENTIAL PRESSURE RELIEF VALVE

George S. Binckley, Los Angeles, Calif., assignor, by decree of court and mesne assignments, to Sydney William Binckley, as trustee Application December 8, 1939, Serial No. 308,208

9 Claims. (Cl. 137—153)

This invention relates to a safety device for the control and limitation of pressures on the opposite sides of a bellows, piston, or diaphragm.

An object of the invention is the provision of means whereby a single valve may be employed to automatically control or limit the difference in pressure in either direction existing between the opposite sides of a bellows, piston or diaphragm.

Another object includes the use of a relief valve for controlling differential pressures, which is rugged, positive in its action, capable of operating under adverse conditions with fluids of any kind, accurate, simple in construction, and superior to relief valves now known to the inventor.

The environment of the invention is for use with any type of fluid. The differential pressure device is adapted to be interposed between a high pressure line and a low pressure line to form a by-pass therebetween. The differential pressure device in certain adaptations may be used either with an orifice plate or with any form of contracted throat wherein there is a high pressure zone on one side thereof, and a low pressure zone on the other side thereof.

The differential pressure device is adapted to control differential pressures regardless of the use to which it is to be put and in certain adaptations of the invention, it may control, electrically or otherwise, certain other apparatus.

Other objects of the invention will readily suggest themselves to those skilled in the art to which this invention appertains, and with the objects set forth aforesaid, the invention consists in the novel and useful provision, formation, construction, association, and relative arrangement of parts, members and features, all as disclosed in certain embodiments in the accompanying drawings, described generally, and more particularly pointed out in the claims.

In the drawings:

Figure 1 is a fragmentary elevation of the invention and showing an indicator scale and a pointer for play thereover, the pointer being controlled by certain means within the casing, Figure 2 is a cross sectional view on the line 2—2 of Figure 1, on an enlarged scale, illustrating the means within the casing, Figure 3 is a fragmentary cross sectional view showing the parts within the casing in a moved position from that of Figure 2, and illustrating an excessive "up" pressure, Figure 4 shows a further moved position of the means within the casing, the parts being moved under an excessive "down" pressure, and, Figure 5 is a cross sectional view of a modified form of the invention, utilizing a diaphragm in place of bellows.

Referring now with particularity to the drawings, 1 is a casing provided with a cover plate 2, held to the casing in any approved manner, such as by means of screws 3 received in threaded bores of the casing, as at 4, the casing having two chamber portions 5 and 6. Without any means within either of said chambers, the two chambers would communicate. However, the instrumentalities that enter into the construction of the present device segregate the chambers, as will hereinafter be set forth. Furthermore, the chambers may differ in area and in fact do differ in the present instance, the chamber 5 being of greater area than the chamber 6. The casing is so formed as to provide as between the two chambers a threaded flange 7. A pipe 8 is threaded within a threaded enlargement 9 communicating with the chamber 6. A pipe 10 is secured within a threaded opening 11 of the cover plate 2 and communicates with chamber 5. The pipe 8 is called the high pressure line, and pipe 10 the low pressure line.

Within the chamber 5 is the following mechanism or means: a large bellows 12, one end of which is secured to a lower bellows head 13 and the opposite end of which bellows is secured to a top bellows head 14. The lower bellows head 13 includes a flat plate 15 provided with a threaded depending flange 16 in threaded engagement with the threads 7, the said plate being provided with an annular flange 17, and with a series of transverse ports 18 between said annular flange 17 and the flange 16. Thus, the lower bellows head 13 fixedly holds one end of the large bellows against movement, whereas the top bellows head 14 is capable of movement as the large bellows is compressed or distended.

The top bellows head 14 includes an annulus 19 having one or more enlargements 20 provided with threaded bores 21, whereby there may be secured to said annulus an annular cap 22 through the medium of screws 23 received within the threaded bores 21. The top of the bellows may be secured to the annulus 19 in any approved manner, such as by spot welding, or otherwise. Within the confines of the annulus 19 is a casing 24 adapted to house a small bellows 25. This casing may be secured to the annulus in any approved manner, and in the present instance, the annulus 19 is provided with an annular shoulder 26, and the casing 24 is formed with an annular flange 27 resting upon said shoulder 26. Thus, when the cap 22 is in position, the casing is held against movement. The casing 24 is provided with an annular depending flange 28, which is externally threaded at 29. The small bellows 25 is secured to the base of the casing 24 in any approved manner, and the upper end of said bellows is secured to a valve 30. This valve is in the form of an annular, triangular cross-sectioned, flange 31. A collar 32 is passed through the central opening of the cap 22, the base of said collar being flanged and resting on the top surface of the valve 30. This collar is provided with one or more transverse perforations or bores 33 which are normally positioned above the top of the cap 22.

A valve seat assembly, designated generally as 34, includes an elongated bolt 35 provided with a flanged head 36 at one end and threaded at 37 inward from the opposite end. Surrounding this bolt and resting against one of the flanges of the head 36 is a sleeve 38, externally threaded at 39 and provided with a valve seat member 40 in the form of a flange, the under surface of which is formed with an annular groove adapted to receive packing 41. It is to be observed that the annular triangular cross-sectioned flange of the valve 30 is positioned so as to engage the packing 41. A nut 42, secured to the threaded end of the bolt, is adapted to hold the valve seat member in position upon said bolt. Adapted for threaded engagement with the threads 39 of the sleeve 38 is a nut 43 provided with spaced radial wings 44. It will be observed that the wings are received within the confines of the flange 28 of the casing. Adapted for engagement with the threads 29 of the flange 28 is a cap-type nut 45. An internally threaded nut 46 is adapted to have threaded engagement with the threads 39 and to act as a jamb nut against the nut 43. This nut 46 is provided with a flange 47 provided with one or more transverse ports 48. The diameter of the flange 47 is sufficient to bridge the annular opening of the flange 17 and to rest upon the top of said flange in a certain position of the valve seat assembly, as hereinafter described.

The cap nut 45 is annularly spaced from the nut 46 as shown at 49. Adapted to surround the valve seat assembly is a coil spring 50; one end of the said spring engages the under surface of the valve 30, and the opposite end rests on the top surface of the wing nut 44. In order to assure that in certain embodiments, fluid may pass between the valve and the valve seat, the sleeve 38 is provided directly beneath the valve seat member 40 with radially spaced wings 51.

Depending from the flanged head 36 of the bolt 35 is a swivel 52. This swivel is adapted to have secured thereto a ribbon 53, the said ribbon in turn being secured to a segment 54 carried upon shaft 55. The shaft is journaled in a bearing 56 in the lower compartment member 6 of the casing 1, and a bearing type gland nut 57 is threaded within an opening of the casing and acts as a bearing for the reduced diameter portion 58 of the shaft 55. This reduced diameter portion 58 carries at its extremity a pointer 59 adapted to play over a graduated scale 60 secured externally of the casing 1. A small coil spring 61 normally urges the pointer to a zero indication on the scale.

Figure 5 illustrates a modified form of the invention wherein I have substituted for the large bellows 12 a diaphragm 62. In this particular, the casing is formed in two parts 63 and 64, the diaphragm being interposed between said casing parts and secured in position by means 65, in the present instance constituting threaded screws passed through threaded lugs. 66 is a low pressure line and 67 a high pressure line, communicating with the chambers 68 and 69, respectively. The remaining parts are the same as for that form of the invention shown in Figures 2 to 4, inclusive, the annulus 70 corresponding to the annulus 19, being secured to the diaphragm, and the casing 24 in turn being secured to said annulus 70. The casing part 64 is provided with an inturned annular flange 71 which corresponds to the annular flange 17.

The operation, uses and advantages of the form of the invention depicted in Figures 2 to 4, inclusive, are as follows:

Figure 2 illustrates what may be termed a neutral position for the parts of the invention, in that it is assumed that the fluid pressure within both bellows is equal to the fluid pressure external of the bellows, at which time there would be what is termed a balanced pressure, and the pointer 59 would be in the position illustrated in Figure 1; in other words, midway between maximum pressure reading and zero reading. Fluid in the chamber 5 is prevented from entering the small bellows due to the fact that the valve is closed against its movable seat. It is apparent, of course, that both the valve seat and the valve are permitted limited movement. Fluid from the high pressure line enters chamber 6 and is allowed to flow through bores 18 into the large bellows and the same fluids flows through ports 48 and 49 into the small bellows 25. The coil spring 50 normally urges the valve 30 against the packing 41 of the valve seat member 40. Fluid from the low pressure side, which fills the chamber 5, flows through the bores 33 and over the top and into the confines of the collar 32, but is prevented from being received within the small bellows due to the fact that the valve is closed against the seat.

If we assume that the pressure on the high side of the line increases above that on the low side, in other words, an excessive "up" pressure, the large bellows 12 will distend as shown in Figure 3. The distention of the large bellows causes movement of the top bellows head 14 and when the top bellows head moves, the valve assembly will likewise be moved for the reason that the cap nut 45 has the base thereof in engagement with the wings 44 of the nut 43, this latter nut being secured to the sleeve 38. Furthermore, the coil spring 50 is compressed as between the wings 44 and the valve 30 so that the valve assembly moves upwardly until the collar 32 is received within the depression 72 and engages the wall to prevent further upward movement of the collar. When this occurs, any further forcible distention of the large bellows will forcibly lift the valve seat from the valve, as illustrated in Figure 3. Thus, damage to the bellows is prevented and a by-pass for the fluid under excessive pressure is permitted past the valve, through the openings 33 of the collar, and into the low pressure line 10.

In a second movement where it is assumed that there is an excessive "down" pressure, we may have the condition as illustrated in Figure 4. The fluid in the chamber 5 compresses the large bellows and as the bellows head carries with it the casing 24, this casing will be moved downwardly, the valve assembly will likewise move downwardly, and the flange 47 may reach a position where it engages the top of the annular flange 17. When this occurs, the valve seat member is prevented from following the valve in any downward movement of the valve assembly, and any excessive "down" pressure upon the large bellows will forcibly depress said bellows to move the valve seat member from engagement with the valve, it being remembered that the bellows head is secured to the casing 24 so that said casing moves in step with movement of the bellows head. A lifting of the valve seat from the valve permits the fluid, whatever its nature, to by-pass through the valve into the low pressure line. Hence, the bellows is protected against damage.

The form of the invention illustrated in Figure 5 operates on the same principle as the main bellows 28, the only difference being in the provision of the diaphragm 62. The operation of both forms of the invention is identical, to-wit: an excessive "up" pressure moves the diaphragm in one direction, to-wit: upwardly with respect to the low pressure chamber 68, and this upward movement carries with it the casing 24 surrounding the small bellows until such time as the collar 32 contacts the annular flange 73 inwardly depending from the casing part 63, whereupon movement of the valve seat may occur to relieve excessive pressure. Excessive "down" pressure will move the diaphragm inwardly of the chamber 69 until such time as the flange 47 contacts the top surface of the member 71, whereupon further downward movement of the diaphragm, carrying with it the casing 24, will open the valve from its seat and again permit equalization of the pressures.

The above described device in its two adaptations is capable of accomplishing all the objects of the invention and provides a differential pressure device which is rugged and capable of long use and service without attention.

While I have specifically mentioned a piston, it is evident that the bellows is one form of piston within a chamber and utilized for segregating the chamber into two compartments, one of which is the interior of the bellows and the other of which is the chamber exterior the bellows. In the case of a piston, the segregation would be the same as that depicted by both the bellows and the diaphragm in Figure 5. The piston would carry the valve assembly and the small bellows, as shown in any of the figures, and the operation thereof would be the same as just described for the two forms of invention illustrated.

I do not desire to limit the present invention to any form of indicator, as illustrated in Figure 1, although such a differential pressure indicator may be interposed between a high pressure line and a low pressure line, the present invention being incorporated with such an indicator as shown.

A relatively stiff spring 50 may be utilized in the present invention, as it is evident that forcible distention or contraction of the large bellows positively opens the valve, the valve not depending for its opening or closing upon the unit differential pressure, but the resistance of the strong spring, which would require the direct action of a differential pressure far in excess of the safe maximum, is overcome and the valve opening accomplished by the action of the predetermined maximum differential upon the entire effective area of the large bellows. This is an important feature of the present invention, because most valves now known to the inventor utilize only the unit pressure for opening the valve against the resistance of the spring, and at best, such valves are subject to leakage due to the fact that the spring pressure cannot exceed the maximum fluid pressure and that there is always a point at which the valve is just ready to open or is partially open, with the result that positive action of the valve in opening and closing is not secured.

The function of the small bellows is to confine a fluid and to prevent passage of fluid from one chamber to the other until the valve is opened. I, therefore, do not wish to confine this invention to the use of a small bellows, as any other means might be utilized in its place, as long as the fluid is confined as between the valve and one of the chambers.

While I have shown my invention in two of its best forms, yet I do not wish to confine the invention to any particular shape of configuration, but reserve to myself such modifications as may come within a fair interpretation of the claims and the description as given.

I claim:

1. A differential pressure device, including a casing, a bellows within said casing and segregating the same into two chambers, a valve carried by the bellows and interposed between the two chambers, said bellows opening said valve upon movement beyond a predetermined movement in either direction, the valve otherwise remaining closed.

2. A differential pressure device, including a casing adapted to have connection with pressure lines, a bellows within said casing, the interior of which is in communication with one of said pressure lines and the exterior of which is in communication with the other of said pressure lines, and valve means carried by the bellows, said bellows opening said valve means upon movement of said bellows beyond a predetermined distention and predetermined contraction thereof to permit communication between the pressure lines.

3. A differential pressure device, including a casing, a bellows within said casing, a pressure line communicating with the interior of said bellows and a pressure line communicating with said casing and the exterior of the bellows, and a normally closed valve carried by the bellows, excessive pressure within or exterior the bellows opening the said valve upon movement of the bellows beyond a predetermined movement to permit communication between the two pressure lines.

4. A differential pressure device, including a casing adapted to have communication with two pressure lines, a valve normally closing communication between said pressure lines, a bellows, and means carried by the bellows for actuating the valve to open the same upon movement of said bellows beyond a predetermined distention or contraction.

5. A differential pressure device, including a casing, a bellows within said casing and secured at one end thereto, a bellows head for the opposite end of said bellows, a valve and its seat carried by the bellows head, means limiting joint movement of the valve and its seat to unseat the valve and open the same upon exceeding a predetermined distention of said bellows, and other means for moving said seat from said valve upon exceeding a predetermined contraction of said bellows.

6. A differential pressure device, including a casing, high and low pressure lines communicating with said casing, a bellows within said casing, the interior of which communicates with one pressure line and the exterior of which communicates with the other pressure line, a second bellows, a casing therefor, the casing secured to one end of the first bellows, a valve and its seat, the said valve secured to one end of the second bellows, differential pressure upon said first bellows moving the same together with the said valve and seat, and means for arresting movement of the valve after a given movement of the bellows to move the valve seat from said valve to equalize the fluid pressure.

7. A differential pressure device, including a casing, a bellows within said casing and anchored at one end thereto, a second casing within the first casing and secured to the opposite end of the said bellows, a second bellows within the second casing, one end of which is anchored to the second casing, a valve secured to the opposite end of said second bellows, a valve seat, and means normally urging said valve into valve seat engagement.

8. A differential pressure device, including a casing, a bellows within said casing and anchored at one end thereto, a second casing within the first casing and secured to the opposite end of the said bellows, a second bellows within the second casing, one end of which is anchored to the second casing, a valve secured to the opposite end of said second bellows, a valve seat, means normally urging said valve into valve seat engagement, and means secured to the valve seat for indicating movement thereof when the bellows is moved under differential fluid pressure.

9. A differential pressure device, including a casing, pressure lines leading to the interior of said casing, a bellows fixedly secured at one end to said casing, the interior of which bellows communicates with one of said pressure lines and the exterior of which bellows communicates with the other pressure line, a second casing secured to the opposite end of said bellows whereby distention or contraction of said bellows moves the second casing, a second bellows within the second casing, one end of which second bellows is secured to the second casing, a valve carried by the opposite end of said second bellows, a valve seat for said valve, differential pressure upon the first bellows moving the second casing, the valve and valve seat in one direction, and means to limit movement of said valve to open the valve seat from the valve when a predetermined differential pressure is exceeded to equalize pressures on both sides of the first bellows.

GEORGE S. BINCKLEY.